United States Patent [19]

Haines

[11] Patent Number: 4,825,929

[45] Date of Patent: May 2, 1989

[54] VEHICULAR SHADE

[75] Inventor: Richard K. Haines, Elkhart, Ind.

[73] Assignee: Elkhart Door, Inc., Elkhart, Ind.

[21] Appl. No.: 166,040

[22] Filed: Mar. 9, 1988

Related U.S. Application Data

[63] Continuation-in-part of Ser. No. 785,800, Oct. 9, 1985, Pat. No. 4,733,710.

[51] Int. Cl.⁴ .................................................. E06B 3/94
[52] U.S. Cl. ................................ 160/84.1; 160/279; 160/107
[58] Field of Search ................... 160/84.1, 115, 178.2, 160/120, 121.1, 166, 174, 176.1, 177, 107, 279, 167

[56] References Cited

U.S. PATENT DOCUMENTS

| | | | |
|---|---|---|---|
| 2,075,462 | 5/1937 | Parmenter | 160/115 |
| 2,094,475 | 9/1937 | Schwarzhaupt | 343/715 |
| 2,146,182 | 2/1939 | Guyer | 160/84 R |
| 2,247,260 | 6/1941 | Stone | 160/84 R |
| 2,836,237 | 5/1958 | Hogin et al. | 160/115 |
| 3,818,969 | 6/1974 | Debs | 160/172 X |
| 3,952,789 | 4/1976 | Marotto | 160/178 C X |
| 4,202,395 | 5/1980 | Heck et al. | 160/84 R |
| 4,212,341 | 7/1980 | Fisher | 160/84 R |
| 4,347,887 | 9/1982 | Brown | 160/84 R |
| 4,444,239 | 4/1984 | Haines | 160/107 |
| 4,473,101 | 9/1984 | Langeler | 160/84 R |
| 4,476,909 | 10/1984 | Anderle et al. | 160/178 C |
| 4,557,309 | 12/1985 | Judkins | 160/279 |
| 4,574,864 | 3/1986 | Tse | 160/279 X |
| 4,607,677 | 8/1986 | Comeau | 160/84 R |
| 4,753,281 | 6/1988 | Wagner | 160/84.1 |
| 4,762,159 | 8/1988 | Ford | 160/84.1 |

FOREIGN PATENT DOCUMENTS

| | | | |
|---|---|---|---|
| 61284 | 9/1943 | Denmark | 160/84 R |
| 3135790 | 3/1983 | Fed. Rep. of Germany | 160/84 R |
| 531462 | 1/1941 | United Kingdom | 160/84 R |

Primary Examiner—Robert W. Gibson, Jr.
Assistant Examiner—David M. Purol
Attorney, Agent, or Firm—Richard Bushnell

[57] ABSTRACT

A window shade construction for a window having a generally rectangular window frame comprises a pair of flexible cords running substantially from the top to the bottom of the window and attached adjacent respective top and bottom ends of the window frame. Respective top and bottom header members are coupled for slidable movement along the cords. A pleated shade member has a first end coupled to the top header and an opposite end coupled to the bottom header, such that the pleated shade is expandable and collapsible in accordian-like fashion as the top and bottom headers are moved slidably along the cords. A cord tensioning arrangement is provided for engaging and tensioning the cords and for maintaining frictional engagement of the top and bottom headers with the cords for thereby permitting the top and bottom headers to be set at respective desired positions along the cords and for holding the headers in such desired positions and against unintended movement relative to the cords in response to vibration or the like.

18 Claims, 5 Drawing Sheets

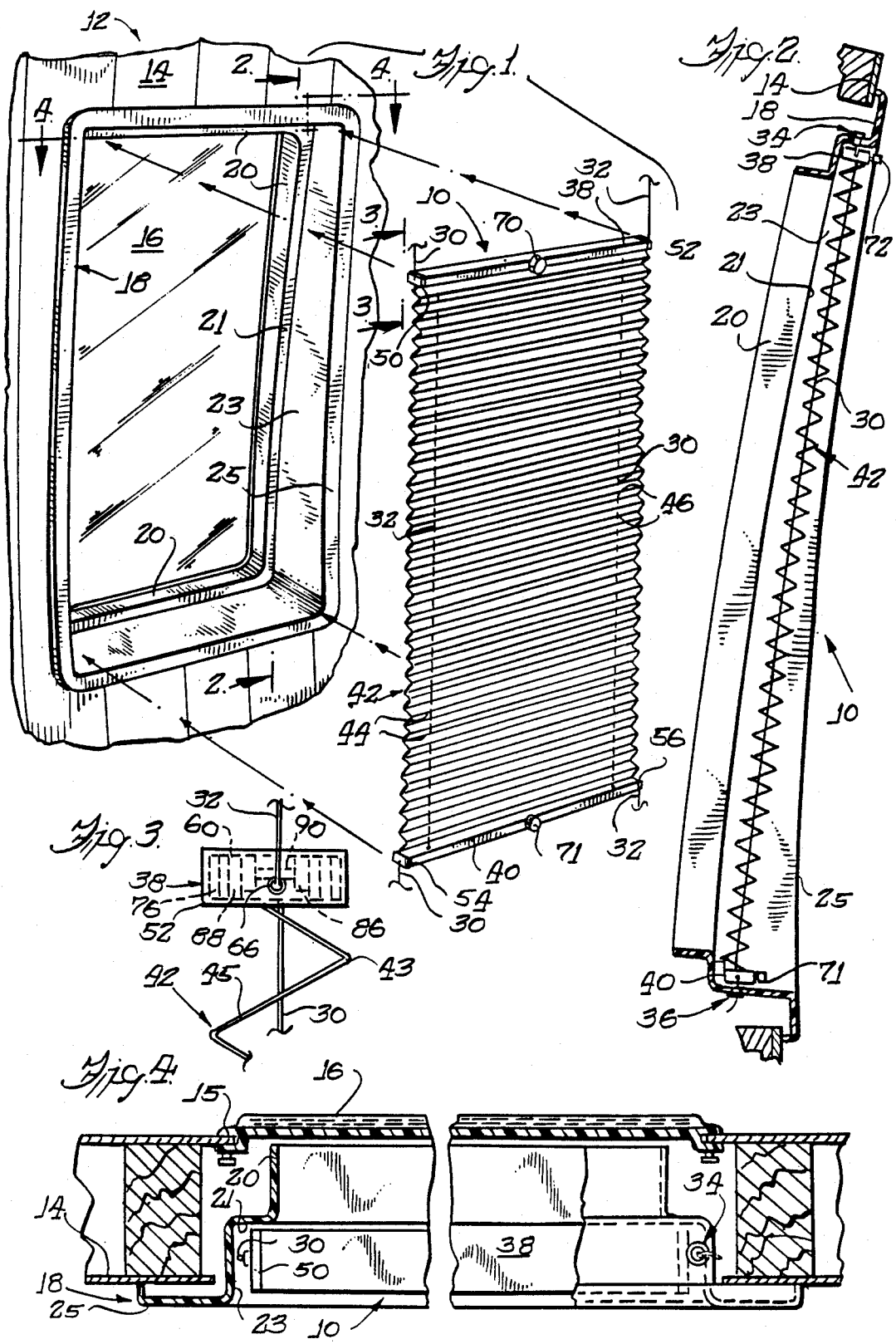

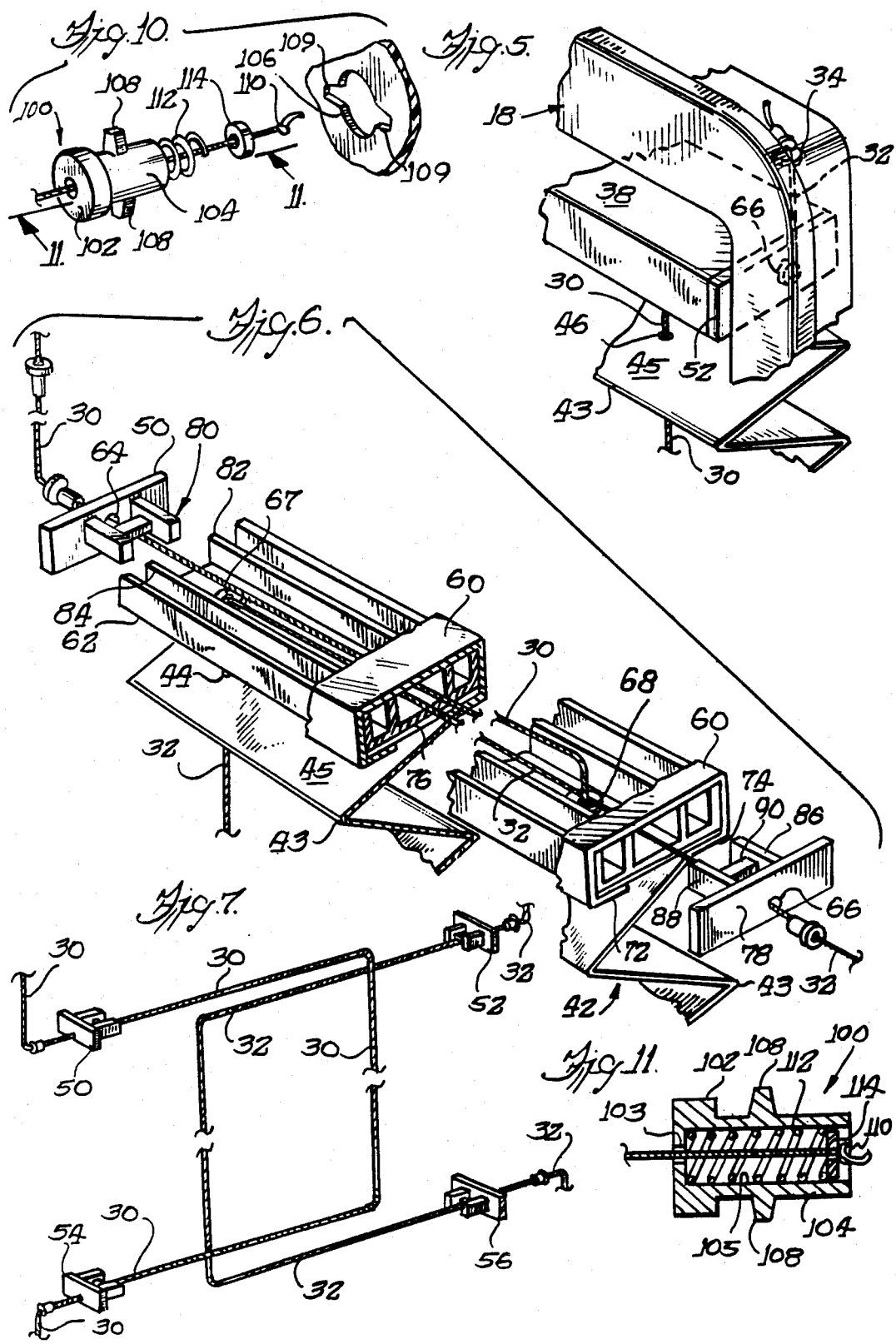

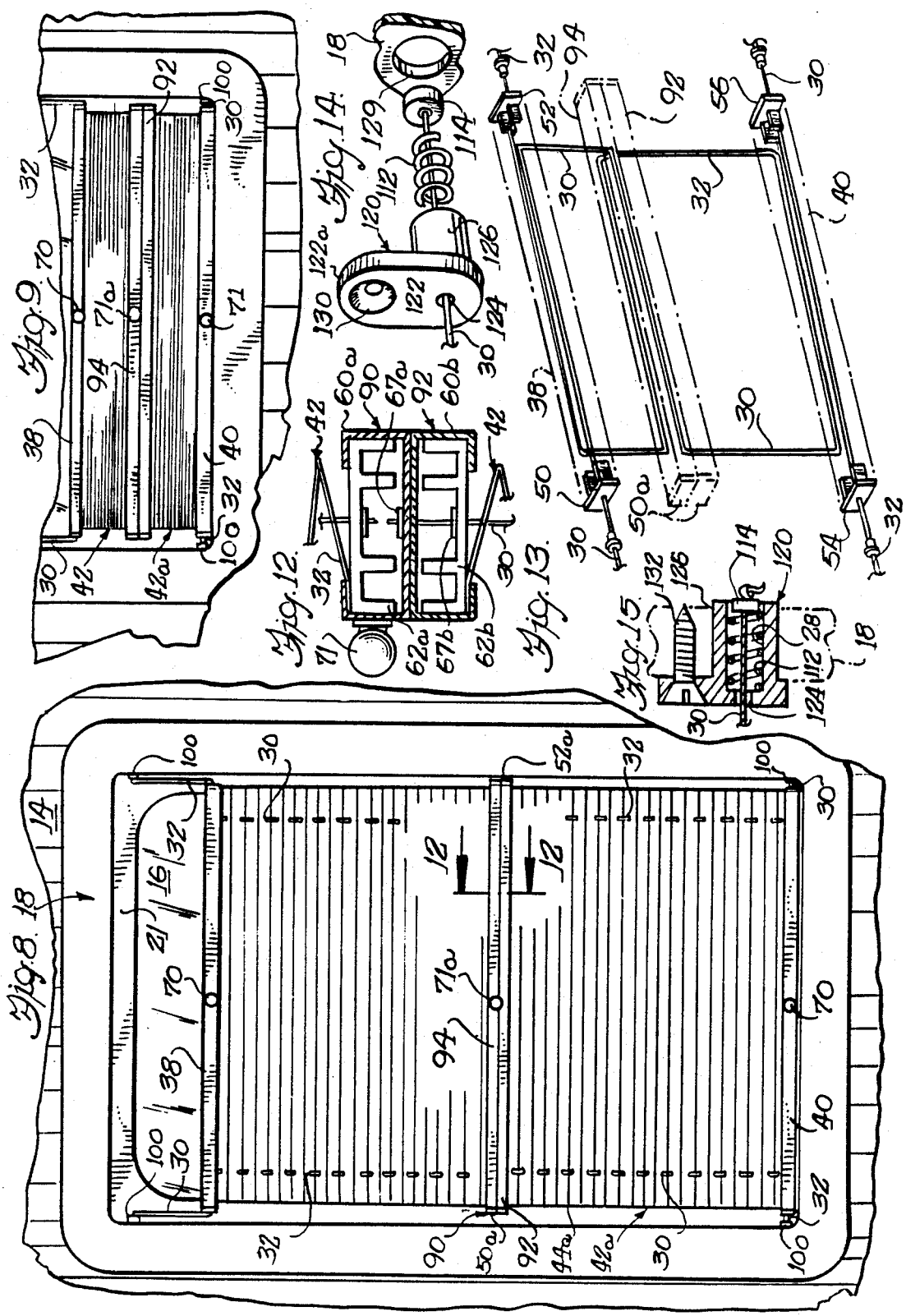

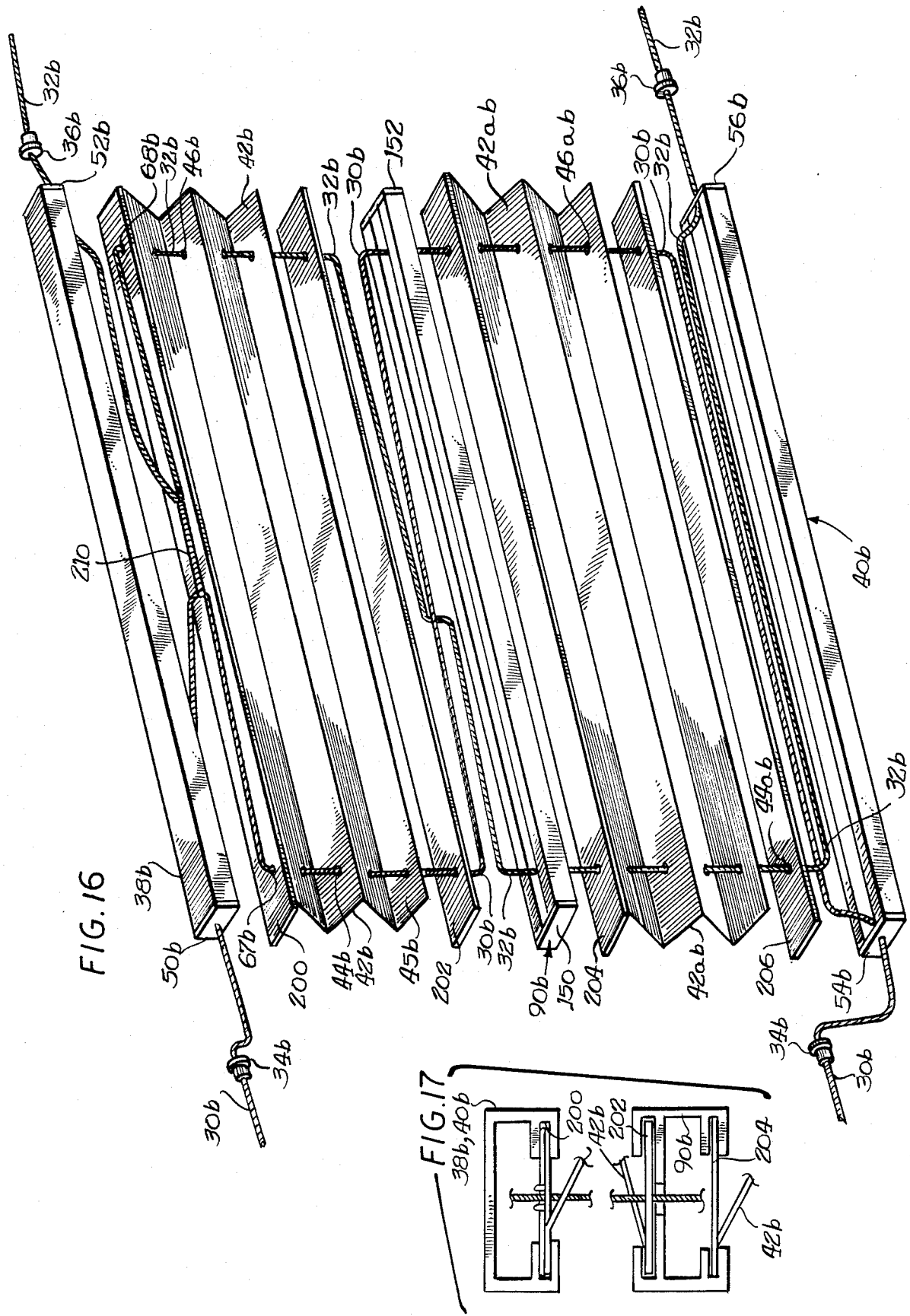

VEHICULAR SHADE

CROSS REFERENCE TO RELATED APPLICATION

This application is a continuation-in-part of my earlier application, Ser. No. 785,800, filed Oct. 9, 1985, now U.S. Pat. No. 4,773,710.

BACKGROUND OF THE INVENTION

This invention relates generally to window shades and more particularly to a window shade construction for mounting a window shade within a frame unit for use in a vehicle such as a van.

The prior art has proposed a number of venetian blind-type window coverings for use in a vehicular or van windows. Such venetian blind constructions are shown for example in my prior U.S. Pat. Nos. 4,444,239 and 4,506,476. These prior U.S. Patents illustrate venetian blind assemblies which are attachable respectively to a vehicle window frame and directly to the glass or other transparent member of the window itself. In the latter case, the window may be hingedly mounted for opening and closing relative to the fixed frame and vehicle wall, whereby the window blind attached thereto moves with the window.

In this regard, window blinds in accordance with some other prior art constructions were permitted to depend or hang from only a top portion of the window or frame. The freely depending or hanging portions of such blinds tend to move about considerably, striking the vehicle or extending into the interior of the vehicle, as the vehicle accelerates, decelerates, pitches and rolls during travel. These latter type of depending or hanging blinds or other window coverings are generally undesirable for this reason.

The prior art, has therefore provided for attachment of window blinds at both top and bottom parts of either the window or window frame to avoid the foregoing drawbacks of depending or hanging blinds. It has also proposed relatively rigid constructions to avoid deformation of the blinds due to wind or the like. Such rigid constructions are illustrated in my above-referenced U.S. Patents.

The present invention provides a shade-type of window covering as an alternative to the venetian blind-type of window covering discussed hereinabove. However, it will be appreciated that some of the same considerations as to resistance to deformation while in use, as well as the avoidance of hanging or depending structures are applicable to such a shade-type of structure as well.

As an additional matter, it is also often desirable when using window shades to provide for continuously variable positioning of the shade relative to the window. That is, the shade preferably should be movable to positions respectively substantially fully covering the window and fully exposing the window and also adjustable to any desired position therebetween. Moreover, it is often desirable to provide a translucent type of shade for daytime use for permitting outside light to enter the vehicle while preventing visual observation of the interior of the vehicle from the outside. On the other hand, for nighttime use, it is desirable to utilize opaque shades for preventing viewing of a lighted vehicle exterior from the unlighted exterior thereof.

OBJECTS AND SUMMARY OF THE INVENTION

Accordingly, it is a general object of the invention to provide a novel and improved window shade construction suitable for use with a vehicle such as a van. A more specific object is to provide a vehicular window shade construction in accordance with the foregoing object which presents no hanging or depending portions relative to the window.

A related object is to provide a vehicular window shade construction in accordance with the foregoing objects which is continuously variably positionable between positions for respectively substantially fully covering and fully exposing the vehicle window.

A further related object is to provide a window shade in accordance with the foregoing objects which permits selectively extendable and collapsible translucent and opaque portions for respective daytime and nighttime use.

Briefly, and in accordance with the forgoing objects, a shade construction for a window having a generally rectangular window frame in accordance with the invention comprises a pair of flexible cords running respectively from top to bottom of said window; a shade structure comprising a pair of headers and a pleated shade member having ends coupled to said headers; said headers and said pleated shade member being slidably mounted to said pair of cords so as to be expandable and collapsible in accordian-like fashion relative to said cords, and cord tensioning means for engaging and tensioning said cords and for maintaining some frictional engagement of the headers with said cords for permitting said headers to be set at a desired orientation along said cords and relative to said window while otherwise facilitating holding of said headers against movement relative to said cords in response to vibration or the like.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description taken in connection with the accompanying drawings in the several figures of which like reference numerals identify like elements, and in which:

FIG. 1 is an exploded perspective view, illustrating a window frame unit and an associated shade construction in accordance with the invention;

FIG. 2 is a somewhat enlarged sectional view taken generally along the line 2—2 of FIG. 1;

FIG. 3 is a further enlarged partial sectional view taken generally along the line 3—3 of FIG. 1;

FIG. 4 is an enlarged partial sectional view taken generally along the line 4—4 of FIG. 1;

FIG. 5 is a partially exploded perspective view illustrating assembly of some of the parts of the shade construction in accordance with the invention;

FIG. 6 is a partial perspective view illustrating further details of the shade construction and its mounting to the window frame of FIG. 1;

FIG. 7 is a somewhat simplified view in diagrammatic form, illustrating a preferred routing of cord elements of the shade construction of the invention;

FIG. 8 is a front plan view of a shade accordance with an alternate embodiment of the invention;

FIG. 9 is a partial front plan view of a portion of a shade construction in accordance with the embodiment of FIG. 8;

FIG. 10 is a fragmentary exploded perspective view showing means for attaching cord elements to the shade construction;

FIG. 11 is an enlarged sectional view taken along line 11—11 in FIG. 10;

FIG. 12 is an enlarged sectional view taken along line 12—12 in FIG. 8;

FIG. 13 is a view similar to FIG. 7, showing a preferred cord routing in the embodiment of FIG. 8;

FIG. 14 is a fragmentary exploded perspective view showing an alternate form of the attaching means of FIG. 10;

FIG. 15 is a sectional view taken generally along line 15—15 in FIG. 14;

FIG. 16 is an exploded perspective view of a further embodiment of a vehicular shade in accordance with my invention;

FIG. 17 is an end view of header members used in the embodiment of FIG. 16;

DETAILED DESCRIPTION OF THE ILLUSTRATED EMBODIMENT

Figure 18:
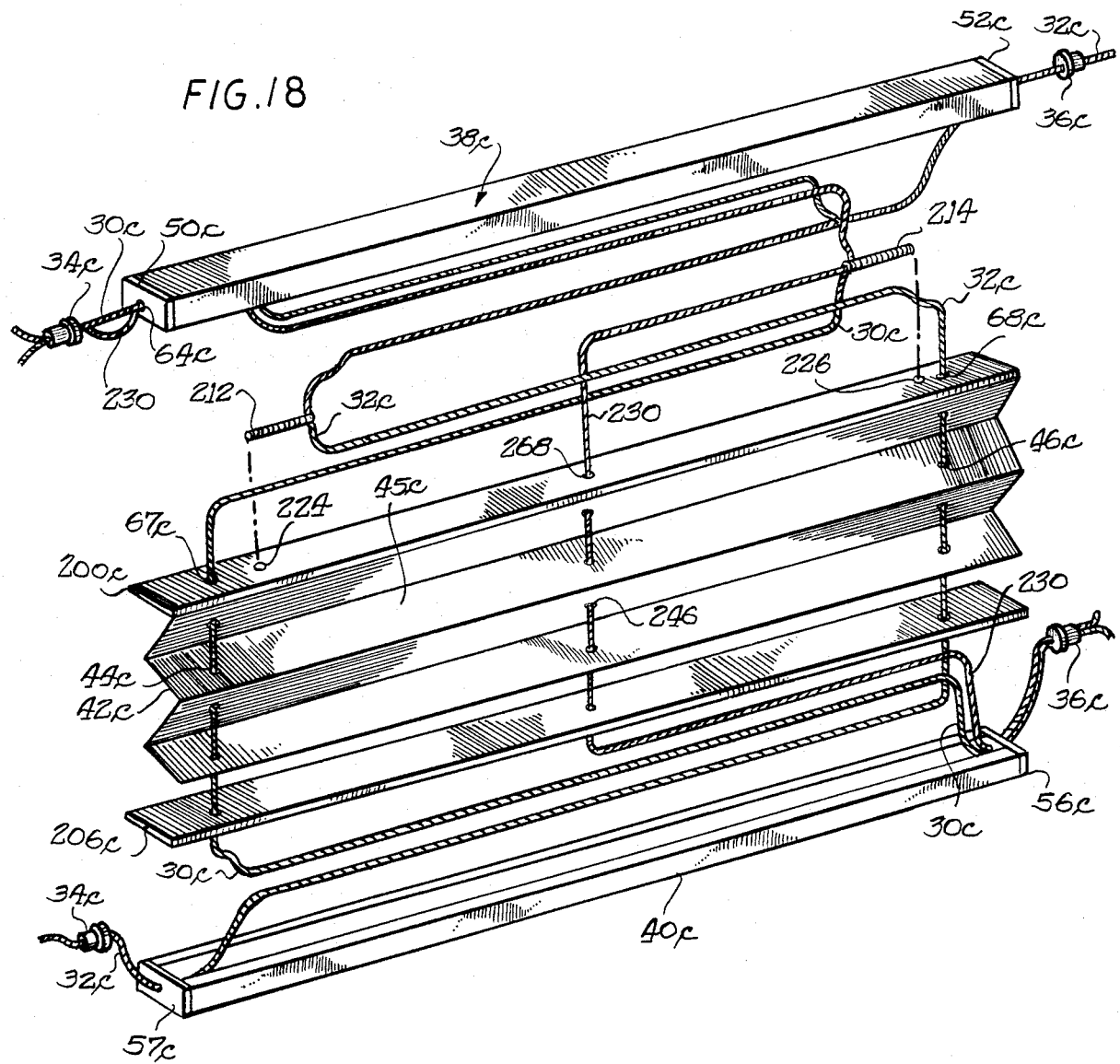
FIG. 18 is an exploded perspective view of yet another embodiment of a vehicular shade in accordance with my invention.

Referring now to the drawings and initially to FIGS. 1 and 2, a window shade construction in accordance with the invention is indicated generally by the reference numeral 10. This window shade construction is suitable for use with a window designated generally by reference numeral 12, which may comprise a window of a van or similar vehicle. This window 12 is set into an exterior wall portion 14 of the van or other vehicle.

The window 12 includes a generally rectangular transparent glazing panel 16 which is fitted to a receiving, generally rectangular frame member designated generally by reference numeral 18. The details of the structure of the window 12 including the frame 18 and glazing panel 16 and its assembly with the wall 14 are fully set forth in my prior U.S Pat. No. 4,444,239 to which reference is invited. Suffice it to say that the frame 18 is generally upwardly and inwardly inclined having surrounding walls 20 for lining a vehicle window opening 15 (see FIG. 4) upwardly and inwardly extending vehicle wall 14 as best viewed in FIG. 1. The corresponding upward and inward inclination of frame 18 is also apparent in FIG. 2. The walls 20 project generally outwardly into a shoulder portion 21 which in turn extend into generally flat sidewall portions 23 which overlie the interior of the opening 15 and vehicle wall 14. These sidewall portions 23 extend into flange portions 25 which extend outwardly and abut an inner face of the vehicle wall 14.

Tuning now more particularly to the window shade construction 10, a pair of flexible cords 30, 32 run from top to bottom of the window 12. These cords 30 and 32 are attached at respective top and bottom edges, and preferably at corners, of the window frame 18 by grommets 34 and 36 shown in FIGS. 2, 3 and 5 extending through apertures in the frame. The cords 30 and 32 are arranged such that substantial portions thereof are locatable in a parallel and spaced apart condition adjacent and parallel to opposite lateral sides of the frame 18.

The window shade construction 10 also includes a shade structure comprising similar top and bottom header members 38 and 40, and a pleated shade member 42 coupled intermediate the top and bottom headers. Preferably, the pleated shade 42 comprises an accordion-pleated shade member, that is, one having a plurality of pleats or folds 43 extending in alternating opposite directions at substantially equal intervals therealong. Hence, shade segments 45 of substantially equal dimensions are defined between respective adjacent pleats 43.

Cord receiving means, which in the illustrated embodiment comprise a plurality of aligned through apertures 44 in respective segments 43 of the pleated shade 42 slidably mount the pleated shade to the cords 30 and 32. In this regard the through apertures 44 and 46 (see also FIG. 5) are located generally spaced apart and adjacent opposite lateral sides of the pleated shade 42 such that the pleated shade is expandable and collapsible in accordion-like fashion relative to the cords. Additional mounting means including respective end caps 50, 52 and 54, 56 which are coupled to the headers 38 and 40 for mounting the headers for slidable movement along the cords 30 and 32. In this regard, these end caps are configured for receiving and directing the respective cords 30 and 32 therethrough and into slidable engagement with the pleated shade member 42.

Moreover, as will be more fully described hereinafter, the mounting means, including the end caps 50, 52 and 54, 56, are arranged to maintain some degree of frictional engagement between the headers 38 and 40 and the cords 30, 32 This frictional engagement is such as to permit the headers to be slidably moved upwardly and downwardly along the cords 30, 32 and set at any desired orientation along the cord relative to the window 16, while otherwise facilitating the holding of the headers 38 and 40 against further movement relative to the cords in response to vibration of the vehicle or like extraneous forces. That is, only positive gripping of the respective headers 38, 40 and urging thereof upwardly or downwardly relative to cords 30 and 32 accomplishes repositioning of the headers 38, 40 and hence of the pleated shade member 42 relative to the window 16. Hence, forces encountered while the van is in motion, for example such as vibration, wind or other forces are generally not sufficient to overcome the frictional engagement between the headers and cords so as to disturb the relative positions of the headers once they have been manually set.

Referring now also to FIGS. 5 through 7, further details of the foregoing structure will now be described. The headers 38 and 40 are substantially identical, whereby only the top header 38 will be described. The header 38 comprises an elongate, hollow, open-ended member defined generally by a pair of channel members 60, 62. In this regard, "inner" channel member 62 will be seen to slidably interfit within "outer" channel member 60, as best viewed in FIG. 6. The mounting means including end caps 50 and 52 further comprises a through aperture 64, 66 in each of these end caps for receiving one of the cords 30, 32 therethrough. Moreover, this mounting means includes a pair of second through apertures formed in the surface or side of the header 38 which faces the pleated shade member 42. These second through apertures 67, 68 are formed adjacent opposite ends of the header 38, and more particularly, through the undersurface of channel 62 so as to align with the through apertures 44 and 46 in the segments 45 of the pleated shade member 42. Hence these latter apertures 67 and 68 are positioned for directing the respective cords 30 and 32 to the through apertures 44 and 46 of the pleated shade. Accordingly, some degree of frictional engagement is thereby defined between the header and the cords as the cords are bent at substantially right angles to extend interiorly of the header from each of the end caps and again to extend through the second through apertures 67 and 68 in the header.

In accordance with the preferred form of the invention illustrated, and as diagrammatically indicated in FIG. 7, each of the respective cords 30 and 32 is disposed extending through the hollow interior of the header 38 from one of the end caps thereof to the through aperture 67 or 68 adjacent the end of the header generally opposite the end cap from which it started. This arrangement further enhances the frictional engagement between each said header and each of the cords. That is to say, as shown in FIGS. 5 and 7, the cords are effectively crossed over each other within each of the headers 38 and 40, such that cord 30 which is attached to the upper and lower left-hand edges or corners of the frame 18 as viewed in FIG. 1 passes through the through apertures in the right-hand side of the pleated shade member 42. Similarly, the cord 32 which is coupled to the upper and lower right-hand edges or corners of the frame 18 as viewed in FIG. 1 passes through the through apertures 44 at the left-hand side of the pleated shade 42 as viewed in FIG. 1.

Hence, each cord, such for example as the cord 30, is folded or bend substantially right angles in at least four places as it passes through the respective end caps and headers, to define a substantial amount of contact therebetween for frictional engagement. Moreover, it will be appreciated that the respective cords 30 and 32 are pulled into a relatively taut condition as they are coupled to the respective corners of the frame 18. Hence, the substantially straight, parallel and spaced segments or sections of the cord upon which the pleated shade member 42 rides are pulled substantially taut. This taut condition helps the shade structure resist forces such as wind or the like which would otherwise tend to distort or move the shade away from window 16, thus holding the shade, when in a closed or extended condition substantially within the frame member 18, as best viewed in FIG. 2.

In this regard, the cords 30 and 32 are sufficiently flexible to be respectively passed through the hollow interiors of the headers and between the respective end caps and through apertures thereof. Thereupon, the cords are pulled substantially taut, as just mentioned, intermediate the end cap apertures and header apertures and are also pulled taut intermediate the end cap apertures and their points of attachment to the upper and lower edges of the frame 18.

As an additional matter, it will be noted that as the shade is being collapsed or retracted, as best viewed in FIGS. 8 and 9, the thus exposed portions of the cords 30 and 32 are disposed relatively closely adjacent the respective inner surfaces 23 of the frame 18 and well behind outer flange portion 25. This substantially avoids accidental snagging or other contact with the exposed portions of cords 30 and 32 when the pleated shade member is in a partially or fully collapsed or retracted position. It will be seen that the coupling of the respective outer ends of these cords at or near the respective corners of the frame 18, together with the running of the cords through the end apertures 64 and 66 at outer ends of the respective end caps cooperate to define this positioning of exposed portions of the cords relatively close to the surfaces 23 as just described.

In the embodiment illustrated in FIGS. 1 through 7, and in FIG. 9, the upper and lower headers 38 and 40 are each slidably movable relative to the cords 30, 32. To facilitate this slidable movement of the headers for desired placement of the pleated shade member 42 relative to the window 16 additional gripping means or members such as knobs 70, 71 are additionally provided on each of the headers. Alternatively, one of the two headers 38 and 40 may be coupled by a bracket or other suitable means to the respective top or bottom edge of the frame 18, such that only one of the headers 38, 40 is slidably movable relative to the cords 30, 32.

As best viewed in FIGS. 5 and 6, each of the headers also includes means for engaging the respective facing end portions or segments of the pleated shade member 42. In this regard, the respective outer and inner channel members 60 and 62 interfit as mentioned above. The outer channel member 60 will be seen to have a pair of inwardly extending flange portions 72, 74 which extend over the undersurface 76 of the inner channel member 62 so as to grippingly engage the pleated shade member end-most portion or segment 45 therebetween.

Referring to FIG. 5, each of the end caps will be seen to comprise a generally rectangular end portion 78 having an outwardly extending strut portion 80 configured for extending into and engaging one of the header open ends for complementary frictional engagement therewithin. In this regard, the inner channel member 62 is provided with a pair of parallel, spaced apart interior wall portions 82, 84. Cooperatively, the strut 80 is defined by a pair of parallel and spaced apart legs 86, 88 and an intermediate strut or support member 90 running therebetween. These legs 86 and 88 are spaced apart for interfitting between respective walls 82, 84 in a close, frictional engagement therewith.

Referring now to FIGS. 8 through 13, in accordance with an alternate embodiment of the invention, a second pleated shade member 42a may also be provided slidable mounted to the cords 30, 32. In the embodiment of FIG. 8, facing ends of the first and second pleated shade members are joined together by further, intermediate header structure 90 which preferably includes a pair of headers 92, 94 in back-to-back arrangement. Each header 92, 94 is substantially similar in details of its construction to the headers 38, 40 described above with reference to FIGS. 1 through 6, like parts being designated by like reference numerals with suffixes a and b. These intermediate headers 92 and 94 thereby engage respective facing end portions or segments of the two pleated shade members 42 and 42a in the same way as described above with respect to the headers 30 and 40. Accordingly, each of these pleated shade members 42 and 42a is extendable and collapsible in response to corresponding movement of one or more of the headers 38, 40 and/or 90 for covering or exposing any desired portions of the window 16 including substantially the entire window.

If desired, the bottommost header 40 in the embodiment of FIG. 8 may be coupled by suitable means to a bottom portion of the frame 18, so as to permit relative slidable movement along the cords 30 and 32 by only the intermediate header construction 90 and top header 38. In this regard, the intermediate header 90 also includes mounting means for slidable frictionally engaging the cords 30 and 32. Preferably, the cords are similarly "crossed over" and directed through header 90 (see FIG. 13) so as to permit this intermediate header 90 to be set to any desired position relative to the window. Hence, each of shades 42 and 42a may be set to any desired position between the respective fully extended and fully retracted or collapsed positions thereof.

Since each of the intermediate headers 92, 94 is substantially similar to the headers 38, 40 described above, it will be appreciated that the respective through apertures 67 and 68 as illustrated in FIG. 5 are also provided at the respective outwardly oppositely facing surfaces of these intermediate headers 92 and 94.

Accordingly, these through apertures are aligned with the through apertures 44, 46 and 44a, 46a of the respective pleated shades 42 and 42a. (In this regard, the second pleated shade member 42a includes through apertures 44a and 46a for receiving the cords therethrough). Moreover, each of the cords 30 and 32 is directed through one of the through apertures of the intermediate header structure 90 at one end of a first one of these oppositely facing surfaces and through the elongate hollow body thereof to and through one of the through apertures at an opposite end of the other oppositely facing surface. That is, as indicated in FIG. 13, the cords 30 and 32 are again crossed over within the hollow body of intermediate header structure 90 to facilitate frictional engagement therebetween.

Accordingly, while end caps 50a, 52a are provided for respective headers 90 and 92, these end caps have now through apertures therein, since the cords 30, 32 are not directed through the end caps of the intermediate headers 90, 92. In this regard, it will also be recognized that suitable aligned through apertures are also provided in the abutting surfaces of outer channel members or portions 60a, 60b of each of the intermediate headers 90, 92 to permit passage of the cord therebetween.

In accordance with a preferred form of the embodiment of FIGS. 8 through 13, one of the pleated shade members 42, 42a is constructed of a translucent or screen-like material, while the other thereof is constructed of an opaque material.

In this embodiment, fastening means or grommets 100 are provided for releaseably securing the ends of the cords to the window frame. As shown best in FIGS. 10 and 11, each grommet has a head 102 having an aperture 103 therethrough. A shank 104 with an enlarged bore 105 extends axially from the head for insertion through a hole 106 in the window frame. Ears 108 project laterally from the shank. The hole 106 is formed with radially projecting slots 109 through which the ears may pass. Upon rotation of the grommet in the hole 106, the ears engage behind the frame for releaseably securing the grommet in assembled relationship with the frame. The cord is secured to the grommet by inserting a portion thereof through the central aperture 103 and then tying a knot 110 in the end. Preferably, a spring 112 is disposed in the bore 105 and acts against an apertured disc 114 through which the cord extends to be knotted at the opposite surface thereof in order to maintain the cord under tension.

It is noted that with the grommets secured to the sidewalls of the frame, the cords are located close to the sidewalls in positions overlying the window opening-defining frame shoulder 21. In this position the cords do not interfere with the window opening and are also substantially protected from accidental injury. While the releasably mountable grommets are shown mounted in the frame sides in the embodiment of FIGS. 8 through 13, it is to be understood that they could also be secured at or near the top and bottom corner positions of the frame as in the embodiment of FIGS. 1 through 5.

Referring now to FIGS. 14 and 15, an alternate form of the grommet or grommet-like attaching member and related structure of FIGS. 10 and 11 is illustrated. This alternate structure comprises an attaching or fastening means or grommet designated generally by the reference numeral 120. The grommets of the form shown in FIGS. 14 and 15 may most advantageously be utilized in connection with the window shades as illustrated in FIGS. 2 and 4, for coupling the respective cores, 30, 32 to top and bottom edges of the frame 18.

The fastening means or grommet 120 includes an enlarged head portion 122 having an aperture 124 therethrough. A shank 126 with an enlarged bore 128 extends from this head 122 for insertion through a hole 129 in the window frame. In order to secure the grommet or attaching member 120 to the window frame, an additional outwardly extending portion or extension 122a is provided for the head 122 and a further through bore or aperture 130 is formed in this extension 122a, for receiving a fastener, such as a threaded screw member 132 therethrough.

The screw member 132 may be of a self-tapping type as illustrated to hold the fastening member 120 to the window frame, or alternatively, a mating fastener such as a nut (not shown) may be utilized.

Reference is next invited to FIGS. 16 through 18 which illustrate yet further embodiments of a vehicular shade in accordance with my invention. Referring first to FIG. 16, the shade construction therein illustrated is substantially similar in many respects to the shade constructions illustrated and described hereinabove. Accordingly, like reference numerals with the suffix b are used to designate similar parts of the structure of FIG. 16.

In similar fashion to the embodiment of FIG. 8, the shade construction of FIG. 16 includes top, bottom and intermediate header members 38b, 40b and 90b. Departing somewhat from the embodiment of FIG. B, the header member 90b comprises a single header member substantially similar in form to the headers 38b and 40b. That is, each of these headers 38b, 40b and 90b comprises an elongate, hollow, open-ended member which may be conveniently formed by cutting an aluminum extruded member to a desired length. However, other methods of fabrication may be utilized without departing from the invention. The form or structure of each of the header members 38b, 40b and 90b will be further appreciated upon reviewing the cross-sectional configuration thereof, as shown in the end view of FIG. 17.

Each of these headers receives one or more relatively rigid, elongate shade-securing members 200, 202, 204 and 206 for securing respective end pleats of a substantially identical pleated shades 42b, 42ab to the respective headers. Each of the elongate shade-securing members 200, 202, etc., may be adhesively or otherwise secured to a facing end pleat of the respective pleated shade members, and then slidable inserted in a pair of channel-like open-ended slots provided therefore in the respective facing ends of each of the headers 38b, 40b and 90b. Preferably, each of the headers 30b, 40b and 90b is provided with suitable axial end closure means which here take the form of end caps 50b, 52b, 54b, 56b and intermediate header member end caps 150, 152. It will be noted that the top and bottommost header caps 50b, 52b and 54b, 56b have through apertures therein for receiving therethrough respective cords 30b, 32b.

In similar fashion to that illustrated in FIG. 7, the respective cords 30b and 32b are crossed over each other within the hollow interiors of intermediate header 90b and of bottom header 40b. Also, respective grommet-like members 34b and 36b are utilized to affix respective ends of the cords 30b and 32b adjacent respective corners of an associated window frame (not shown in FIG. 16). This is accomplished in much the same fashion illustrated for example in FIG. 4 and FIG. 5.

In similar fashion to the above-described embodiments of FIGS. 10–11 and FIGS. 14–15, some tensioning means are preferably provided for engaging respective cords 30b and 32b and maintaining the same under tension or in a tensioned condition. This facilitates the desired smooth, slidable movement of the respective headers with respect to the cords while at the same time maintaining the window shade in relatively close proximities to the window with which it is associated. Such tensioning also aids in holding exposed portions of the cords closely adjacent inner sides of an associated window frame, as shown for example, in FIG. 8, preventing accidental snagging or other contact with the cords. This tensioning also aids in maintaining some degree of frictional engagement between the headers and the cords so as to generally prevent unintentional movement of the headers once set at a desired level or location along the cords, that is, such movement as might occur due to vibration or the like.

Departing somewhat from the embodiment of the spring loaded grommet-like members, which act as the tensioning means in FIGS. 10–11 and in FIGS. 14–15, the embodiments of FIGS. 16 and 18 utilize tension spring means located within the hollow body of at least one of the header members. In the illustrated embodiments, a single tension spring 210 (in FIG. 16) and a pair of tension springs 212, 214 (in FIG. 18) engage and maintain tension on the respective cords 30b, 32b as they run through the associated header.

Turning now also to FIG. 18, it will be noted that similar parts are here designated by similar reference numerals, together with the suffix c. The embodiment of FIG. 18 additionally includes a third or intermediate cord 230, which enters and leaves the construction through respective ends of the top and bottom headers 38c, 40c and generally runs through a center or intermediate set of apertures 246 formed in pleated shade 42c.

Summarizing the above discussion, the shade constructions as illustrated in FIGS. 16 and 18 respectively generally comprise a pair of flexible cords 30b, 32b (30c, 32c) which runs substantially from the top to the bottom of a window or window frame and are attached adjacent respective top and bottom ends of the window frame. Respective top and bottom header members 38b, 40b (38c, 40c) are coupled for slidable movement along the cords, and a pleated shade member 42b (42c) has a first end coupled to the top header and a second end coupled to the bottom header (to the intermediate header in the embodiment of FIG. 16) such that the pleated shade is expandable and collapsible in accordian-like fashion as the headers are moved slidable along the cords.

Figure 19:
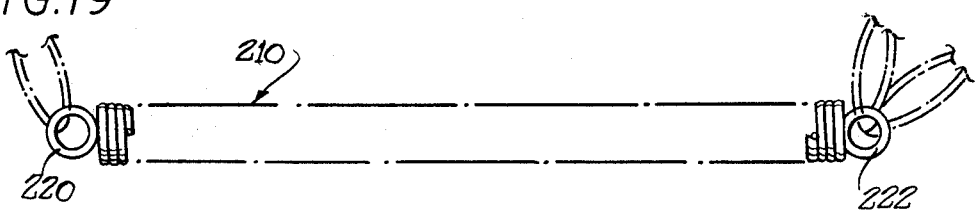
FIGS. 19 and 20 are enlarged views, illustrating further details of a spring member and associated cords, as utilized in the embodiments of FIGS. 16 and 17.
Figure 20:
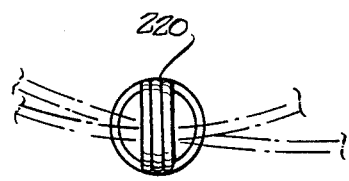

Cord tensioning means, here comprising the tension springs 210 or 212, 214 are provided for engaging and tensioning the cords to maintain frictional engagement of the respective headers with the cords so as to permit the headers to be set at respective desired positions along the cords for holding the headers and associated pleated shade or shades in desired positions along the cords and against any unintended movement in response to vibration or the like, relative to the cords. Each of the headers includes a means defining through apertures in surfaces thereof which face the respective pleated shades. In the illustrated embodiments, these surfaces are formed by the shade securing members 200, 202, etc. (200c, 206c) and are indicated at reference numerals 67b, 68b (67c, 68c). These apertures generally face and are aligned with similar through apertures in each of the segments (45b; 45c) of the respective pleated shade members, which through apertures are designated by reference numerals 44 and 46, with the appropriate suffixes as noted hereinabove. The embodiment of FIG. 16 adds a third header and a second pleated shade. The embodiment of FIG. 18 adds a third cord. Further sub-combinations and variations of these various additional features are to be considered a part of the invention. The tensioning means may comprise the spring-loaded grommet arrangements as illustrated and described above with reference to FIGS. 10 and 11 or FIGS. 14 and 15. In FIGS. 16 and 18, however, these tensioning means generally comprise tension spring means disposed interiorly of at least one of the header members for engaging the cords as they pass through the header member provided with the said spring. In the embodiment illustrated in FIG. 16, the tension spring means comprises a single tension spring 210 which is aligned generally coaxially within the elongate header 38b and is preferably located substantially centrally along the interior length thereof. Referring now to FIGS. 19 and 20, the spring member 210 has respective eyelets 220, 222 formed at its respective ends, such that one of the cords 30b, 32b passes through the eyelet most closely adjacent to or facing the end closure or end cap opening through which that cord enters the header. Thereafter, the cords are doubled over or around the respective eyelets, as best viewed in FIG. 16, so as to exit the header through the one of the apertures 67b, 68b closest the end from which the cord first entered the header. Accordingly the spring 210 effectively provides a tensioning means for maintaining tension on both cords 30b, 32b which in effect pull against each other to help maintain tension throughout the shade assembly. Hence, the shade assembly is effectively held together by these cords while at the same time being mounted to slidable ride (i.e., to extend or collapse the shade) along the cords. Preferably, the cords cross over each other within the header or headers in which the tension springs are not provided.

Similarly, in the embodiment of FIG. 18, the tension spring means comprises a pair of similar tension spring members 212, 214 which are each coupled at one end thereof to the header member, and preferably to the shade securing member 200c by suitable means such as rivets 224, 226. Accordingly, opposite ends of each of the springs 212, 214 have eyelets substantially identical to eyelets 220, 222 as illustrated in FIGS. 19 and 20 for receiving respective cords looped therethrough in such a manner as to maintain tension on each of the cords as it runs from one of the end cap apertures to one of the pleated-shade facing apertures 67c or 68c. In the embodiment of FIG. 18, the single cord 32c is tensioned by looping it through the end eyelet of spring 212 and then returning it or doubling it over to extend back through aperture 68c which is most closely adjacent the end cap 52c through which the cord 32c first entered the header. Similarly, both cords 30c and 230 enter the header through end cap 50c and loop about or double over through the eyelet in the end of spring 214 and return back to exit at respective apertures 67c and intermediate aperture 268. Preferably, the three cords are crossed over each other within the bottom header 40c, prior to exiting through respective end caps 54c and 56c.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modification as fall within the true spirit and scope of the invention.

The invention is claimed as follows:

1. A window shade construction for a window having a generally rectangular window frame, said shade construction comprising: cord means including a pair of portions providing flexible cords running substantially from the top end to the bottom end of said window a head or adjacent one of said ends of the window frame and coupled for slidable movement along said cords; a pleated shade member having a first end coupled to the header and an opposite end positioned toward the other end of said window frame such that said pleated shade is expandable and collapsible in accordian-like fashion as said header is moved slidably along said cords; and cord tensioning means for engaging and tensioning said cords and for maintaining frictional engagement of said header with said cords for thereby permitting said header to be set at a desired position along said cords and for holding said header in said desired position and against unintended movement relative to said cords in response to vibration or the like.

2. A shade construction according to claim 1 which includes a second header secured to said shade toward said other end of the window frame and each of said headers comprising an elongate, hollow, open-ended member, and further including end closure means at either end of each of said headers, each said end closure means for at least one of said headers having a through aperture for receiving one of said cords therethrough; to thereby direct exposed portions of said cords along and closely adjacent to respective side walls of said window frame to substantially avoid accidental snagging of, or other contact with, the cords.

3. A shade construction according to claim 2 and further including means defining a pair of through apertures at a surface of each header which faces said pleated shade member for receiving said cords therethrough, and wherein said pleated shade member has a plurality of pairs of aligned through apertures in respective segments thereof alignable with the through apertures defined at the facing surfaces of said headers for receiving said cords therethrough.

4. A shade construction according to claim 2 and further including grommet means for attaching at least one end of each of said cords to said window frame, each of said grommet means comprising a head having an aperture axially therethrough, a shank extending axially from said head through said window frame, said shank having an axial bore therethrough, an end portion of an associated cord extending axially through said head and said shank, and wherein said tensioning means comprises spring means disposed in said bore for engaging the associated cord end and for maintaining the associated cord under tension.

5. A shade construction according to claim 2 wherein said tensioning means comprising tension spring means disposed interiorly of at least one of said headers for engaging said cords as they pass through said one of said headers.

6. A shade construction according to claim 5 wherein said tension spring means comprises a single tension spring aligned generally coaxially within said one of said elongate headers, and located substantially centrally along the length thereof; said spring member having eyelets formed at its respective ends, and one of said cords passing through the eyelet most closely adjacent a first end closure from which that cord extends, the cord thereafter doubling back from said eyelet to pass through the pleated shade facing aperture most closely adjacent the same said end closure from which it extends.

7. A shade construction according to claim 6 wherein said cords are crossed one over the other within the hollow body of the header member opposite the header member having the spring member therein, such that each cord passes from one of the pleated shade-facing apertures to the end closure apertures farther therefrom.

8. A shade construction according to claim 5 wherein said tension spring means comprises a pair of tension spring members, each having one end thereof coupled to said header member and an opposite end having eyelet means for receiving one of said cords looped therethrough for maintaining tension on said cord as it runs from an end closure aperture to one of the pleated shade-facing apertures.

9. A shade construction according to claim 2 and further including a third, intermediate header member, said pleating shade member running between said first mentioned header and the third header and a second pleated shade member running between said second mentioned header and said third header member and coupled respectively therewith, said third header member also being slidably mounted to said cord means, such that either or both of said first and second pleated shade members may be moved between a fully collapsed position and a fully extended position relative to the window and associated window frame.

10. A shade construction according to claim 9 wherein both of said first and second mentioned header end closure means have a through aperture for receiving one of said cords therethrough; to thereby direct exposed portions of said cords along and closely adjacent to respective side walls of said window frame for attachment adjacent respective top and bottom corners thereof to substantially avoid accidentally snagging of, or other contact with, the cords.

11. A shade construction according to claim 10 and further including grommet means for attaching at least one end of each of said cords to said window frame, each of said grommet means comprising a head having an aperture axially therethrough, a shank extending axially from said head through said window frame, said shank having an axial bore therethrough, an end portion of an associated cord extending axially through said head and said shank, and wherein said tensioning means comprises spring means disposed in said bore for engaging the associated cord end and for maintaining the associated cord under tension.

12. A shade construction according to claim 10 wherein said tensioning means comprises tension spring means disposed interiorly of at least one of said header members for engaging and tensioning said cords as they pass through said header member.

13. A shade construction according to claim 12 wherein said tension spring means comprises a single tension spring aligned generally coaxially within the associated elongate header, and located substantially centrally along the length thereof; said spring member having eyelets formed at its respective ends, and one of said cords passing through the eyelet most closely adjacent the aperture through which that cord enters the header, the cord thereafter doubling back from said eyelet to pass through the pleated shade-facing aperture most closely adjacent the aperture through which it entered the header.

14. A shade construction according to claim 13 wherein said cords are crossed one over the other within the hollow body of the header members other than the header member having the spring member therein.

15. A shade construction according to claim 10 wherein said spring means comprises a pair of tension spring members, each having one end thereof coupled to said header member and an opposite end having eyelet means for receiving one of said cords looped therethrough for maintaining tension on said cord as it runs through the header.

16. A shade construction according to claim 3 and further including a third cord member, said pleated shade member having a set of intermediate apertures through respective segments thereof located between said pair of apertures for receiving said third cord therethrough, and each said header having a further aperture aligned with said intermediate apertures for receiving said third cord therethrough, said third cord being directed outwardly of each header through one of the end closure apertures thereof.

17. A shade construction according to claim 16 wherein said tensioning means comprises tension spring means disposed interiorly of at least one of said first and second mentioned headers for engaging and tensioning each of said cords as they pass through said header.

18. A shade construction according to claim 17 wherein said tension spring means comprises a pair of tension spring members, each having one end thereof coupled to said header and an opposite end having eyelet means for receiving at least one of said cords looped therethrough for maintaining tension on said cord as it runs from an end closure aperture to one of the pleated shade-facing apertures.

* * * * *

UNITED STATES PATENT AND TRADEMARK OFFICE
CERTIFICATE OF CORRECTION

PATENT NO. : 4,825,929

DATED : May 2, 1989

INVENTOR(S) : Richard K. Haines

It is certified that error appears in the above-identified patent and that said Letters Patent is hereby corrected as shown below:

Column 3, line 1, please add the words -- construction in-- between "shade" and "accordance".

Column 8, line 46, please change "FIG. B" to read --FIG.8--.

Column 11, line 34, please change "head or" to read -- header --.

Signed and Sealed this

Sixteenth Day of January, 1990

*Attest:*

JEFFREY M. SAMUELS

*Attesting Officer*     *Acting Commissioner of Patents and Trademarks*